Oct. 30, 1962     N. W. FESMIRE ETAL     3,061,134
CARGO CONTAINERS
Filed Nov. 14, 1960                                  6 Sheets-Sheet 1
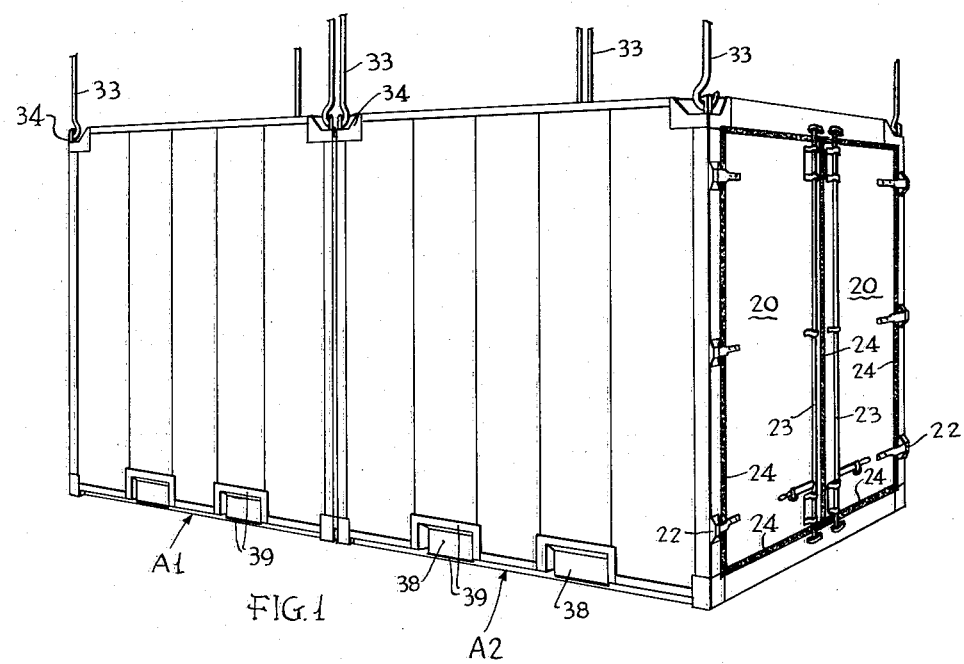
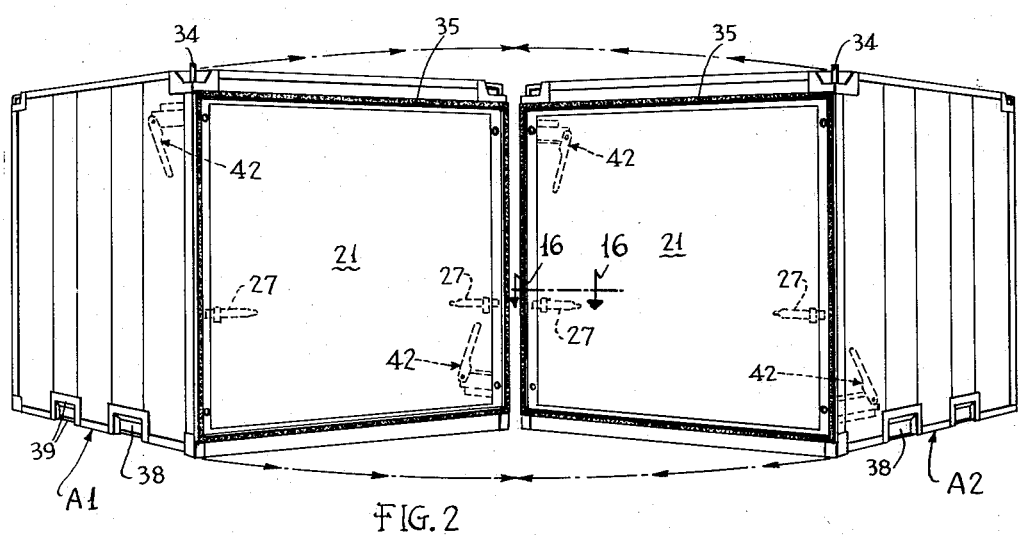
INVENTORS
Norman W. Fesmire
BY    George W. Schane
Wm. R. Glisson
ATTORNEY

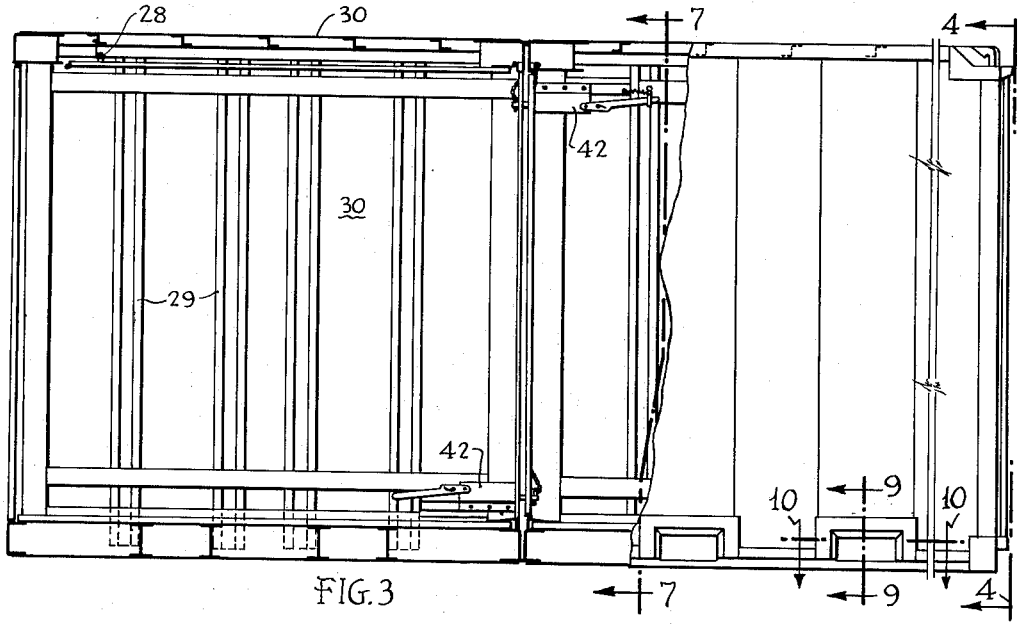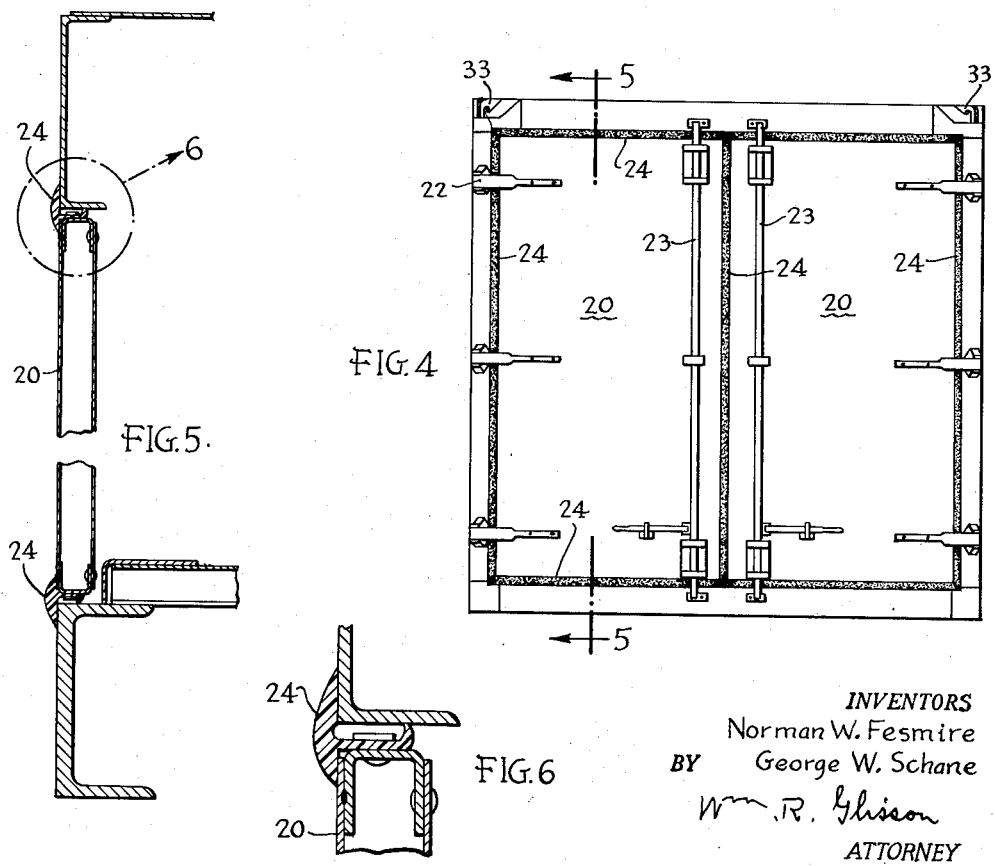

Oct. 30, 1962

N. W. FESMIRE ETAL 3,061,134

CARGO CONTAINERS

Filed Nov. 14, 1960

INVENTORS
Norman W. Fesmire
BY George W. Schane

Wm. R. Glusson

ATTORNEY

*INVENTORS*
Norman W. Fesmire
George W. Schane
BY
*ATTORNEY*

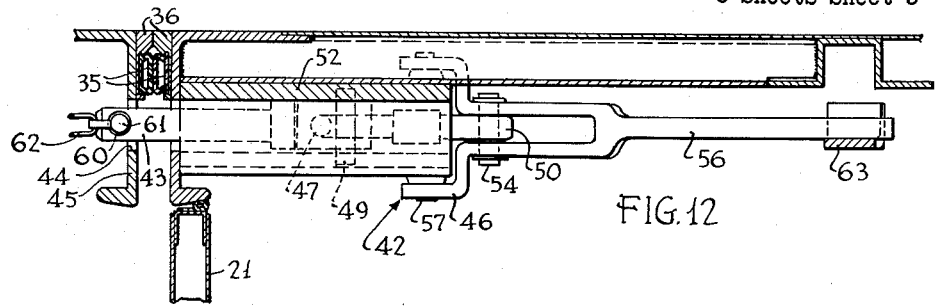
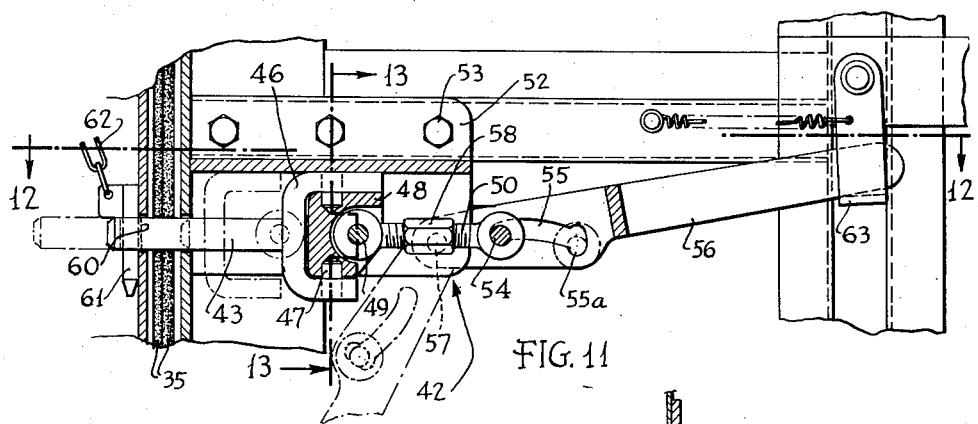
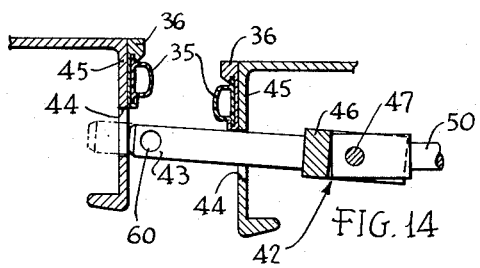
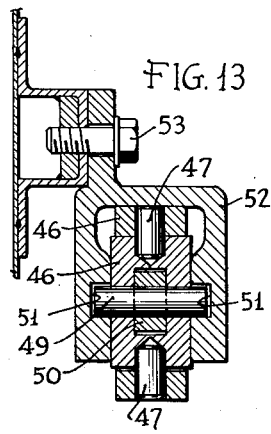
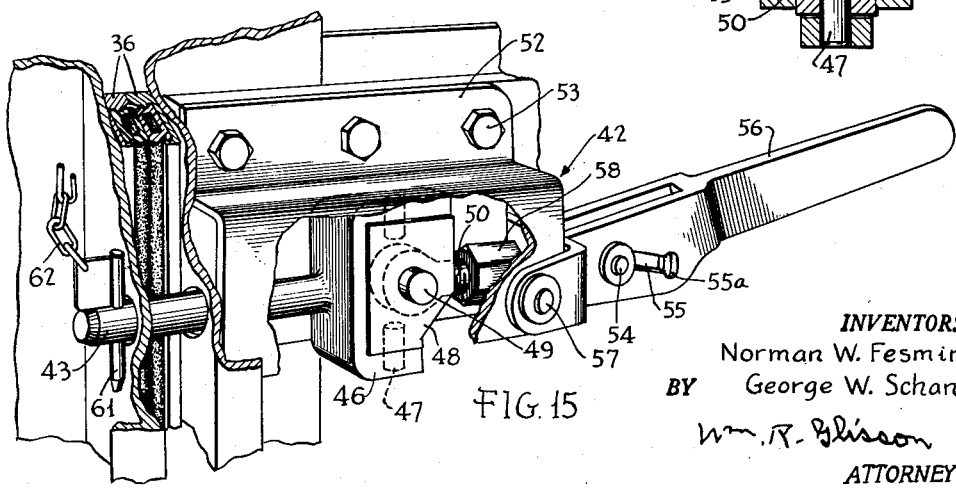
INVENTORS
Norman W. Fesmire
George W. Schane
BY
Wm. R. Blisson
ATTORNEY Oct. 30, 1962 N. W. FESMIRE ETAL 3,061,134
CARGO CONTAINERS
Filed Nov. 14, 1960 6 Sheets-Sheet 6

INVENTORS.
Norman W. Fesmire
BY George W. Schane.

Wm. R. Glisson
ATTORNEY

United States Patent Office 3,061,134
Patented Oct. 30, 1962

3,061,134
CARGO CONTAINERS
Norman W. Fesmire, Huntingdon Valley, and George W. Schane, Philadelphia, Pa., assignors to The Budd Company, Philadelphia, Pa., a corporation of Pennsylvania
Filed Nov. 14, 1960, Ser. No. 69,219
13 Claims. (Cl. 220—1.5)

This invention relates to cargo containers, such as are adapted to carry heavy cargo and to be handled by train, truck, ship and hoist, and has for an object the provision of improvements in this art. This application is a continuation-in-part of our copending application, Serial No. 3,945, filed January 21, 1960, now abandoned.

One of the particular objects of the invention is to provide containers which are independently usable as single units and which can be joined to form a dual unit.

Another object is to provide identical containers which when placed end-to-end provide connecting means at the four corners for securing them together for handling as a single unit.

Another object is to provide sealing means for the closures of a single unit.

Another object is to provide sealing means between container units when they are connected end-to-end.

Another object is to provide rigid peripheral abutting stop and guide strips around the end openings to protect the sealing strips from undue compression and from injury from the outside.

Another object is to provide a simple and convenient latch for drawing and holding the container units together.

The above and other objects and advantages of the invention will be apparent from the following description of an exemplary embodiment, reference being made to the accompanying drawings, wherein:

FIG. 1 is a side and end perspective view of two container units coupled together and suspended by crane hooks;

FIG. 2 is a partially exploded perspective view to show the ends of two container units;

FIG. 3 is an inside elevation, with part of one container shown in side elevation, of two container units joined together;

FIG. 4 is a rear end elevation of one container unit, the view being taken on the line 4—4 of FIG. 3;

FIG. 5 is an enlarged shortened vertical longitudinal section taken on the line 5—5 of FIG. 4;

FIG. 6 is a partial enlarged section at circle 6 of FIG. 5;

FIG. 11 is a partial vertical longitudinal section taken on the line 11—11 of FIG. 7;

FIG. 12 is a horizontal section taken on the line 12—12 of FIG. 11;

FIG. 13 is an enlarged vertical transverse section taken on the line 13—13 of FIG. 11;

FIG. 14 is a partial vertical section like FIG. 11 but showing the parts in spaced position before they are pulled together;

FIG. 15 is a perspective view, with parts broken away to show the connected relationship;

Figure 9:
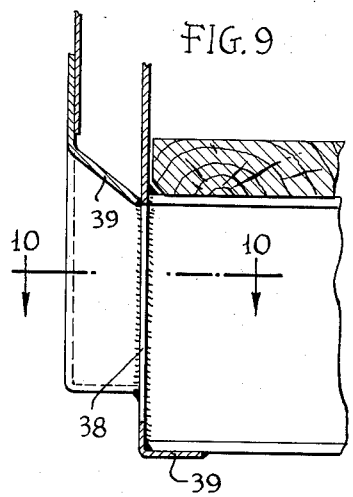
FIG. 9 is a partial enlarged vertical transverse section taken on the line 9—9 of FIG. 3.
Figure 7:
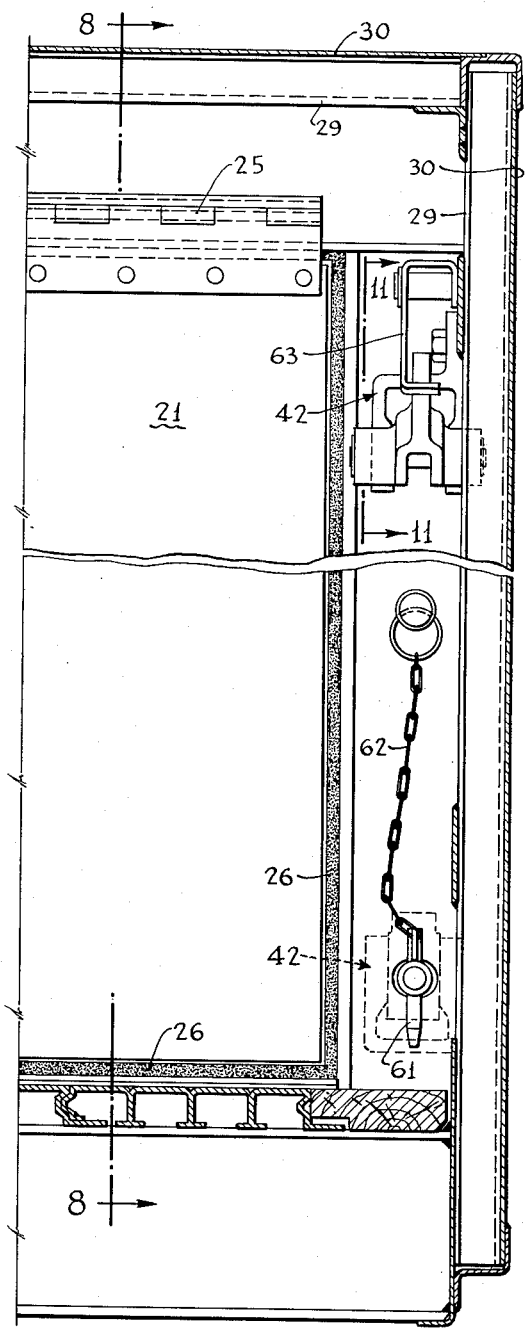
FIG. 7 is an enlarged vertical transverse section taken on the line 7—7 of FIG. 3.
Figure 10:
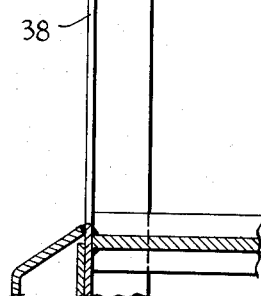
FIG. 10 is an enlarged horizontal section taken on the line 10—10 of FIG. 3, the section line also being shown in FIG. 9.

As shown in FIGS. 1 and 2, the invention provides two identical container units, A1 and A2 which are provided with rear doors 20 and front doors 21. The rear doors 20 are of a generally conventional type which hinge at 22 on the sides and latch at 23 at the middle. They are provided with resilient plastic (includes rubber) weather strip 24 so as to be completely sealed when closed.

The front door 21 of each container unit is hinged at the top, as at 25 (FIG. 8), so as to swing from a vertical closed position where it is sealed by resilient plastic weather strip 26 and held by inside latches 27 to a raised open position where it may be held up by latches 28. The latch 28 is supported by a body structure member 29 inside the outer covering (here the roof panel) 30.

Two of the identical containers are adapted to be placed together, front-end-to-front-end, to form a double unit. FIG. 2 shows the containers approaching each other by angular movement but in practice they are brought together by straight line movement, as along a floor or by hoist movement. When the two front ends are brought together and the front doors are opened the space in the two containers is thrown together to form one large compartment and when the two containers are secured together the dual unit may be handled as a single large container. When lifted by crane hooks 33, as shown in FIG. 1, it is preferred to use all eight hook fittings 34 of both single containers to avoid putting undue strain on the container connections. This, however, is a matter of relative size of structurals and connections and these can be made adequate to avoid damage even when a double unit is lifted solely by its four end fittings.

Figure 8:
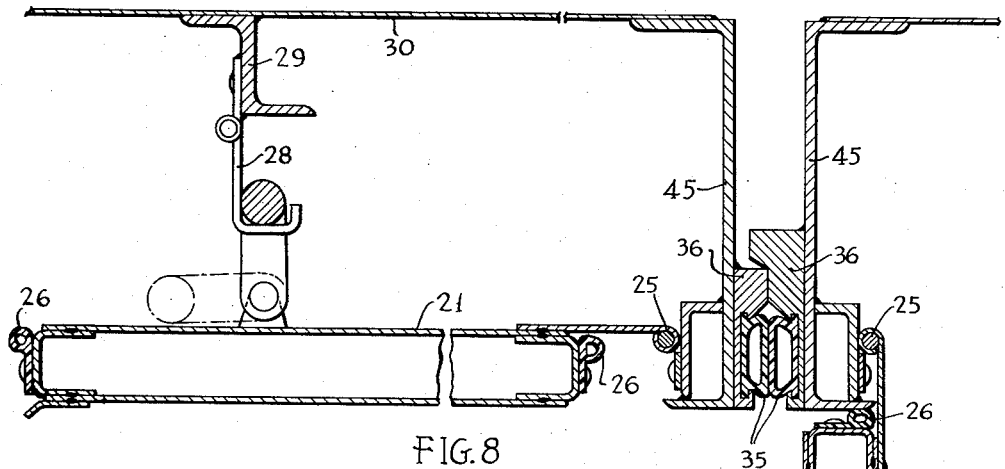
FIG. 8 is an enlarged shortened vertical longitudinal section taken on the line 8—8 of FIG. 7.
Figure 16:
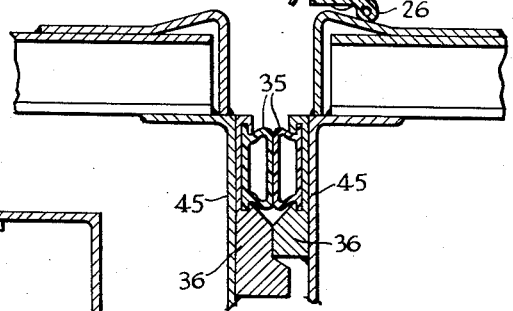
FIG. 16 is an enlarged horizontal section taken on the line 16—16 of FIG. 2, the section line also being shown in FIG. 17.
Figure 17:
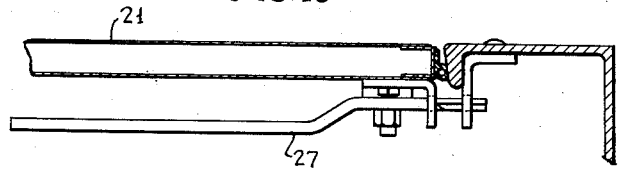
FIG. 17 is an elevation of the parts shown in FIG. 16.

Exterior peripheral resilient plastic weather strip 35 is secured around the periphery of each front end door opening, the strips yieldingly engaging together to form a tight seal when the containers are drawn together. Peripheral metal abutment strips 36 are provided outside the weather strips to keep undue loads off the resilient strips and to provide mechanical protection for the weather strips in both the joined and the separated condition. The abutment strips may have tapered overlapping edges, as shown in FIG. 8, to make the containers register accurately when they are pushed together and to reduce loading on the connecting means.

The containers are adapted to be handled by fork trucks as well as by cranes and for this purpose they are provided with fork bar pockets 38 with body reinforcement 39, as shown in FIGS. 1, 2, 3, 9 and 10.

As shown in FIGS. 7, 11, 12, 13, 14 and 15, draw bar latch means are provided for securing the containers together. FIG. 2 shows the latch locations in two containers which are being brought together. Each container is identical with the other and has latches 42 in diagonally opposite corners so that when the containers are brought together in oppositely facing relationship there is a latch for each of the four corners.

Each latch comprises a latch bar or bolt 43 adapted to pass through oversized holes 44 in the heavy door frames 45 at the front ends of the containers. The holes are made oversize so the bars 43 can be entered in the holes even when the container ends are not in correct alignment. FIG. 14 shows this condition.

The bar or bolt 43 is carried by a swivel yoke 46, as by being formed integrally therewith, and the first swivel member is hinged, as by pivot means 47, to a second swivel member 48. The second swivel member is hinged, as by pivot means 49, at 90 degrees to the pivot means 47, to an operating bar or link 50. As shown in FIG. 13, the ends of the pivot means or pin 49 protrude outwardly and slide in grooves 51 formed in a frame 52 which is secured to the side of the container, as by cap bolts 53.

This double swivel mounting for the latch bar 43 allows it to have movement in all directions in the oversize holes in establishing a connection. It is always retained in the hole of the container on which the latch is mounted so it can never drop down out of operative position.

The operating bar or link 50 is provided with a pivot pin 54 which has protruding ends positioned in slots 55 formed in the spaced furcations of an operating lever 56 which is pivoted to the sides of the frame 52 by pins 57. The link 50 is adjustable in length, as by being made in two parts with right and left hand threads connected by a turnbuckle nut 58.

When the handle or lever 56 is swung down (FIG. 11) the latch bar 43 is moved far forward, as shown by the left broken line position in FIGS. 11 and 14, so that it projects through the hole 44 in the end frame of the adjacent container. The latch bar has a hole 60 in its end in which a keeper pin 61 is inserted after the bar has been protruded into the adjacent container. The pin 61 is retained against loss by a keeper chain 62.

When the lever 50 is pulled up the bar 43 with its keeper pin 61 is pulled back and the containers are tightly pulled together. The pivots 49, 54 and 57 assume an overcenter locking position when the lever is pulled up but for safety a swingable holding loop 63 is provided for holding the handle up. This is needed only for the two upper latches since the two lower latches swing in the opposite direction and will stay down with the assistance of gravity in the pulled-up position.

When a container is used alone the latch bar is moved further back to the right broken line position of FIG. 11 by moving the pivot pin 54 to the other end of the slots 55 where it is retained by a notch 55a in the slot.

Figure 18:
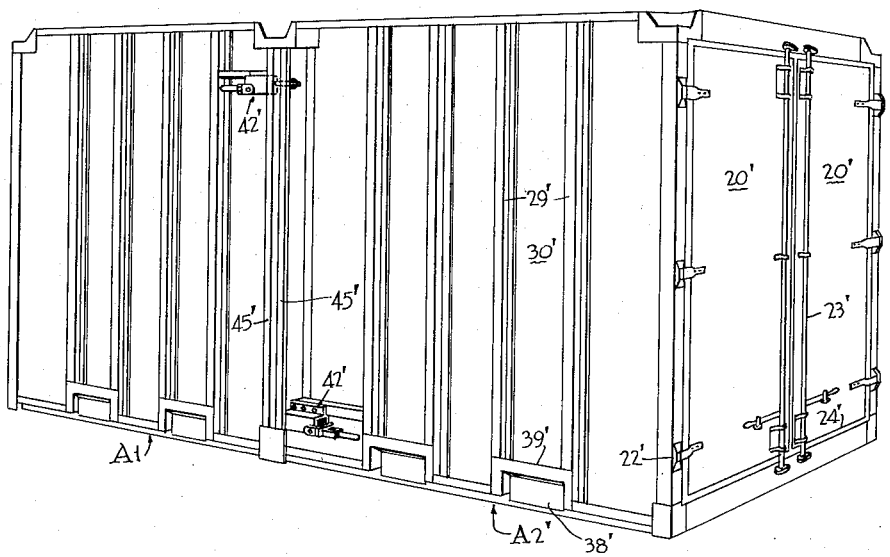
FIG. 18 is a view similar to FIG. 1 but showing a modification in which the latches are located outside the containers instead of inside.
Figure 19:
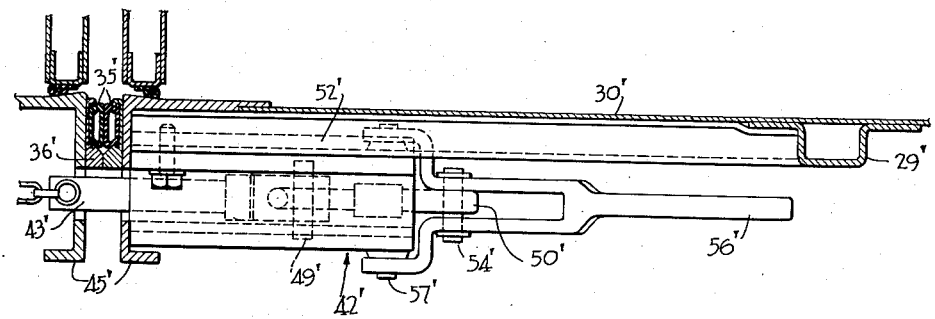
FIG. 19 is an enlarged horizontal section taken on the line 19—19 of FIG. 18.

The embodiment shown in FIGS. 18 and 19 is the same as the first embodiment shown in FIGS. 1–17, except that the latches are located on the outside of the containers instead of on the inside. Insofar as applicable, the same reference characters are used with a prime (') added.

There are containers A1' and A2' having rear doors 20' with hinges 22', latches 23' and weather stripping 24'.

The other end may have doors like those shown before; or may have doors which swing on other hinge axes; or be removable; may be left out altogether in some cases; or the ends may be without doors altogether in some cases. That is to say, where the novel latch arrangement is used the door arrangement at this end may vary widely. Where inside latches are used it is more likely that doors at this end are needed; but where outside latches are used it can be advantageous merely to connect containers for handling purposes. If there are doors or end openings then the weather stripping 35' and abutment strips 36' will be used, the abutment strips, as before, being located outwardly of the weather strip to protect it mechanically.

The containers at the end are provided with outwardly extending frame members 45' which carry latches 42', the latches being arranged diagonally opposed, as before, so that all containers are alike and mate with a latch at each corner when arranged end-to-end.

The latches are the same as before and the same reference characters are used with a prime (') added.

While it has been indicated that the doors 21 can be opened when two containers are brought together so as to provide a common cargo space, it will be obvious that these doors could be left closed and the cargo loaded and unloaded at the other end doors insofar as the coupling together of two containers for handling as a single rigid unit is concerned.

It is thus seen that the invention provides a new and improved cargo container which can be used either singly or duplexed, and also provides improved means for securing the containers together.

While specific embodiments have been described for purposes of illustration it is to be understood that there may be various embodiments and modifications within the general scope of the invention.

What is claimed is:

1. A cargo container adapted to be used alone as a single unit or to be rigidly connected to another identical container in mating end-to-end relationship so as to be handled as a coupled rigid unit, said container comprising a rigid enclosure with bottom, top and sides and at least one end opening so that two such containers when coupled together with open ends together provide a common continuous compartment through the open ends, peripheral reinforcement carried by the end of the container around the end opening, and latches and latch-retaining elements carried by said peripheral reinforcement at separate complementary locations such that when two identical containers are placed end-to-end with the reinforced open ends together the latches of each container will mate with and engage the latch-retaining elements of the other container and hold the containers rigidly together for handling as a rigid unit.

2. A cargo container as set forth in claim 1, which further includes a closure hinged at its upper edge inside the container to swing upwardly therein, said latches and latch-retaining elements being mounted on the sides of the container, and latches for holding said closure in either open or closed position.

3. Cargo containers as set forth in claim 1, in which said latches are located at diagonally opposite points and latch-engaging elements are arranged at the other diagonally opposite points.

4. Cargo containers as set forth in claim 1, further characterized by the fact that the end of the container having the latches and end opening also has peripheral exterior weather stripping around said opening in position to seal the space between container end peripheries when two containers are coupled together.

5. Cargo containers as set forth in claim 1, further characterized by the fact that the end of the container having the latches and end opening also has peripheral exterior weather stripping and abutment positioning strips around said opening in position to seal the space between and provide rigid engagement between container end peripheries when two containers are coupled together.

6. Cargo containers as set forth in claim 1, further characterized by the fact that the end of the container having the latches and end opening also has an inwardly swinging closure therefor, and exterior peripheral weather stripping and positioning strips around said opening in position to seal the space between and fix the relative position between the peripheries of the openings of two containers when coupled together.

7. Cargo containers as set forth in claim 1, further characterized by the fact that said reinforcing elements and latches and latch-retaining elements are located on the inside of the containers and that the latches are extensible to engage the latch-retaining elements of a companion coupled container.

8. Cargo containers as set forth in claim 1, further characterized by the fact that said reinforcing elements and latches and latch-retaining elements are located on the outside of the container and that the latches are extensible to engage the latch-retaining elements of a companion coupled container.

9. Cargo containers as set forth in claim 1, wherein said latches each comprises a sliding bolt which is projectable through aligning holes in the reinforcing elements of two containers, means securing the end of the bolt behind the element of a mating container when it is projected, and a lever for pulling the bolt back to pull two containers together.

10. Cargo containers as set forth in claim 9, wherein oversize holes are provided for said bolt and said latch provides a connection for said bolt allowing side movement thereof.

11. Cargo containers as set forth in claim 9, wherein said latch includes a universal connection and a link for operating said bolt, a lever having a slotted pivot connection with said link, and said link having length adjustment, said lever having an over-center locking connection, and the slot allowing the bolt to be withdrawn from an exteriorly protruding position.

12. Cargo containers adapted for single use with a single compartment space or duplex use with a double length compartment space, comprising in combination with an enclosed container, rear end doors therefor, front end doors therefor, interior latch means for holding the front end door in closed position, interior latch means for holding the front end door in open position, and pull bolt latches at diagonally opposed corners inside the front end of the containers for securing two containers together in front-end-to-front-end relationship, two identical containers when disposed together front-end-to-front-end having latches at all four corners.

13. Cargo containers as set forth in claim 12, wherein an exterior rigid abutment strip is provided peripherally around the front door opening outside the weather stripping to limit the pressure on said exterior weather strip and to protect the weather strip from injury from the side.

References Cited in the file of this patent
UNITED STATES PATENTS

| | | |
|---|---|---|
| 1,847,158 | Woodruff | Mar. 1, 1932 |
| 1,886,418 | Muchnic | Nov. 8, 1932 |
| 2,038,064 | Stetson | Apr. 21, 1936 |
| 2,644,602 | Ross | July 7, 1953 |
| 2,761,581 | Cohee | Sept. 4, 1956 |
| 3,004,682 | Bertolini | Oct. 17, 1961 |